(12) United States Patent
Walker

(10) Patent No.: US 6,301,537 B1
(45) Date of Patent: Oct. 9, 2001

(54) ADAPTIVE CALIBRATION OF X-Y POSITION SENSOR

(75) Inventor: James M. Walker, Kalamazoo, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/587,503

(22) Filed: Jun. 5, 2000

(51) Int. Cl.$^7$ .................................................. B60K 17/04
(52) U.S. Cl. ........................... 701/51; 701/58; 74/336 R; 74/335; 74/473.1
(58) Field of Search ................... 701/51, 58; 74/473.12, 74/473.32, 335, 473.1, 336 R

(56) References Cited

U.S. PATENT DOCUMENTS

| | | | |
|---|---|---|---|
| 4,515,029 | 5/1985 | Reynolds et al. | 74/339 |
| 4,821,590 | 4/1989 | Tury et al. | 74/335 |
| 4,899,607 | 2/1990 | Stainton | 74/335 |
| 4,920,815 | 5/1990 | Reynolds | 74/335 |
| 4,935,872 * | 6/1990 | Benford et al. | 701/51 |
| 5,281,902 | 1/1994 | Edelen et al. | 318/632 |
| 5,481,170 | 1/1996 | Edelen | 318/650 |
| 5,586,029 * | 12/1996 | Schulz et al. | 701/51 |
| 5,646,842 * | 7/1997 | Schulz et al. | 701/51 |
| 5,743,143 | 4/1998 | Carpenter et al. | 74/335 |
| 5,758,302 * | 5/1998 | Schulz et al. | 701/51 |
| 5,911,787 | 6/1999 | Walker | 74/335 |
| 5,950,491 | 9/1999 | Wadas | 74/335 |
| 6,227,067 * | 5/2001 | Steeby et al. | 74/473.12 |

* cited by examiner

Primary Examiner—William A. Cuchlinski, Jr.
Assistant Examiner—Olga Hernandez
(74) Attorney, Agent, or Firm—Howard D. Gordon

(57) ABSTRACT

A method/system for adaptively calibrating an X-Y position sensor (46). Signals ($SL_{X-X}$ and $SL_{Y-Y}$) indicative of X-X and Y-Y positions of a shift member (SL) in an H-type shift pattern (12A) are sensed. The current Y-Y position ($SL_{Y-Y}$) when the rate of change of X-X position exceeds a reference (($d/dt$) $SL_{X-X}$ REF) is indicative of the neutral position value ($N_{Y-Y}$) of the second signal.

26 Claims, 4 Drawing Sheets

ADAPTIVE CALIBRATION OF X-Y POSITION SENSOR

BACKGROUND OF THE INVENTION

1. Field of the Invention

The present invention relates to a method/system for calibrating a position sensor for sensing the X-Y position of a shift member in a vehicular transmission shifter. More particularly, the present invention relates to an adaptive technique for calibrating the neutral Y-Y position in an X-Y position sensor for sensing the position of a shift member movable in an "H-type" shift pattern.

2. Description of the Prior Art

Manually operated shift levers and X-Y shifters for moving a shift member, such as a shift finger or the like, in an H-type shift pattern are well known in the prior art, as may be seen by reference to U.S. Pat. Nos. 5,481,170; 5,281,902; 4,899,607; 4,821,590; 4,784,007; 4,455,883 and 4,515,029, the disclosures of which are incorporated herein by reference.

Position sensors of the discrete position type for sensing discrete X-Y positions of a shift member in an H-type shift pattern are known in the prior art, as may be seen by reference to U.S. Pat. Nos. 4,817,468 and 4,718,307. Sensors providing analog or digital signals, the magnitude of which are representative of the X-X and/or Y-Y position of a shift member in an H-type shift pattern, are known in the prior art, as may be seen by reference to U.S. Pat. Nos. 5,911,787; 5,743,143 and 5,950,491, the disclosures of which are incorporated herein by reference.

SUMMARY OF THE INVENTION

In accordance with the present invention, an adaptive technique for calibrating the value of a control signal corresponding to the neutral Y-Y position of a shift member movable in an H-type shift pattern is provided.

The foregoing is accomplished by providing a sensor providing a first signal having a magnitude corresponding to X-X position, and a second signal having a magnitude corresponding to Y-Y position, of a shift member in an H-type shift pattern. When the change in the first signal, or preferably the rate of change in the first signal, exceeds a reference value, the magnitude of the second signal is taken as the value corresponding to the shift member being in the neutral Y-Y position in the shift pattern. To prevent anomalies, the value of the second signal corresponding to a neutral position will preferably be filtered in an averaging technique (see U.S. Pat. No. 5,490,063, the disclosure of which is incorporated herein by reference).

Accordingly, it is an object of the present invention to provide an improved method/system for adaptively calibrating an X-Y position sensor for a shift member movable in an H-type shift pattern.

This and other objects and advantages of the present invention will become apparent from a reading of the following description of the preferred embodiment taken in connection with the attached drawings.

DESCRIPTION OF THE PREFERRED EMBODIMENT

Figure 1:
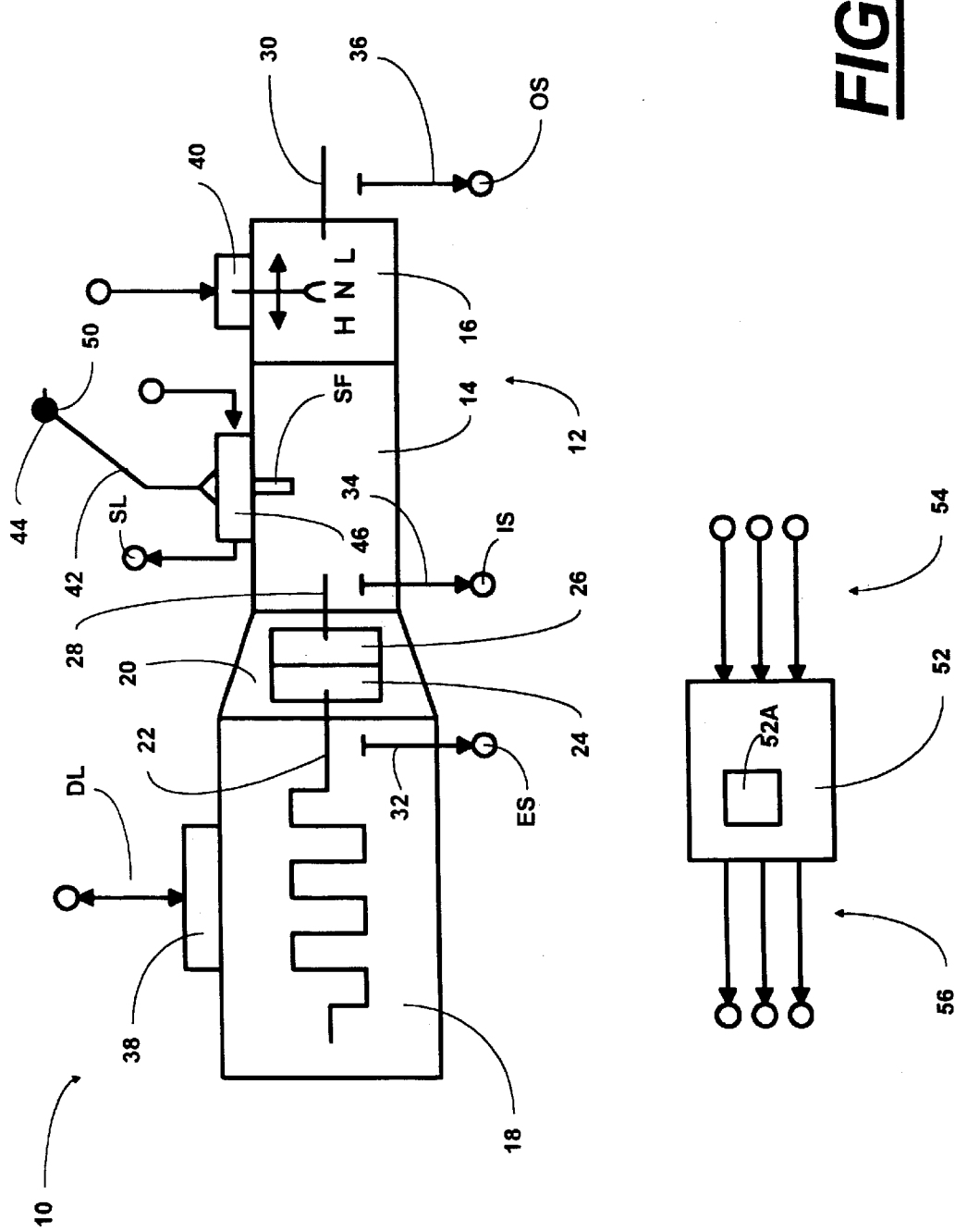
FIG. 1 is a schematic illustration of a vehicular drivetrain using the adaptive calibration method/control system of the present invention.

An at least partially automated vehicular drivetrain system 10 using the adaptive calibration technique of the present invention is schematically illustrated in FIG. 1. System 10 may be fully automated, as seen by way of example in U.S. Pat. No. 4,361,060, partially automated, as seen by way of example in U.S. Pat. No. 4,648,290, or manual with controller assist, as seen by way of example in U.S. Pat. Nos. 4,850,236; 5,582,558; 5,735,771 and 6,015,366, the disclosures of which are incorporated herein by reference.

In system 10, a change-gear transmission 12 comprising a manually or automatically shifted main transmission section 14 connected in series with a splitter-type auxiliary transmission 16 is drivingly connected to an internal combustion engine 18, such as a well-known gasoline or diesel engine, by a manually or automatically operated master friction clutch 20 or other non-positive coupling. Preferably, auxiliary transmission section 16 is of the three-layer, four-speed combined splitter/range type, as illustrated in U.S. Pat. Nos. 4,754,665 and 5,390,561, the disclosures of which are incorporated herein by reference.

Engine 18 includes a crankshaft 22, which is attached to a driving member 24 of master clutch 20, which is normally frictionally engaged with a driven member 26, which is attached to the input shaft 28 of the transmission. A transmission output shaft 30 extends from the auxiliary transmission section 16 for driving connection to the vehicular drive wheels, as through a drive axle or the like. For purposes of illustration, transmission 12 is illustrated as a (2+1)×(2)×(2) type transmission providing nine or ten selectable forward ratios, as may be seen by reference to the shift pattern 12A schematically illustrated in FIG. 2. Transmissions of this general type are well known in the prior art and are sold by the assignee of this application, EATON CORPORATION, under the trademark "Super-10" and may be seen in greater detail by reference to U.S. Pat. Nos. 6,015,366; 5,974,906 and 5,974,354, the disclosures of which are incorporated herein by reference.

Figure 2:
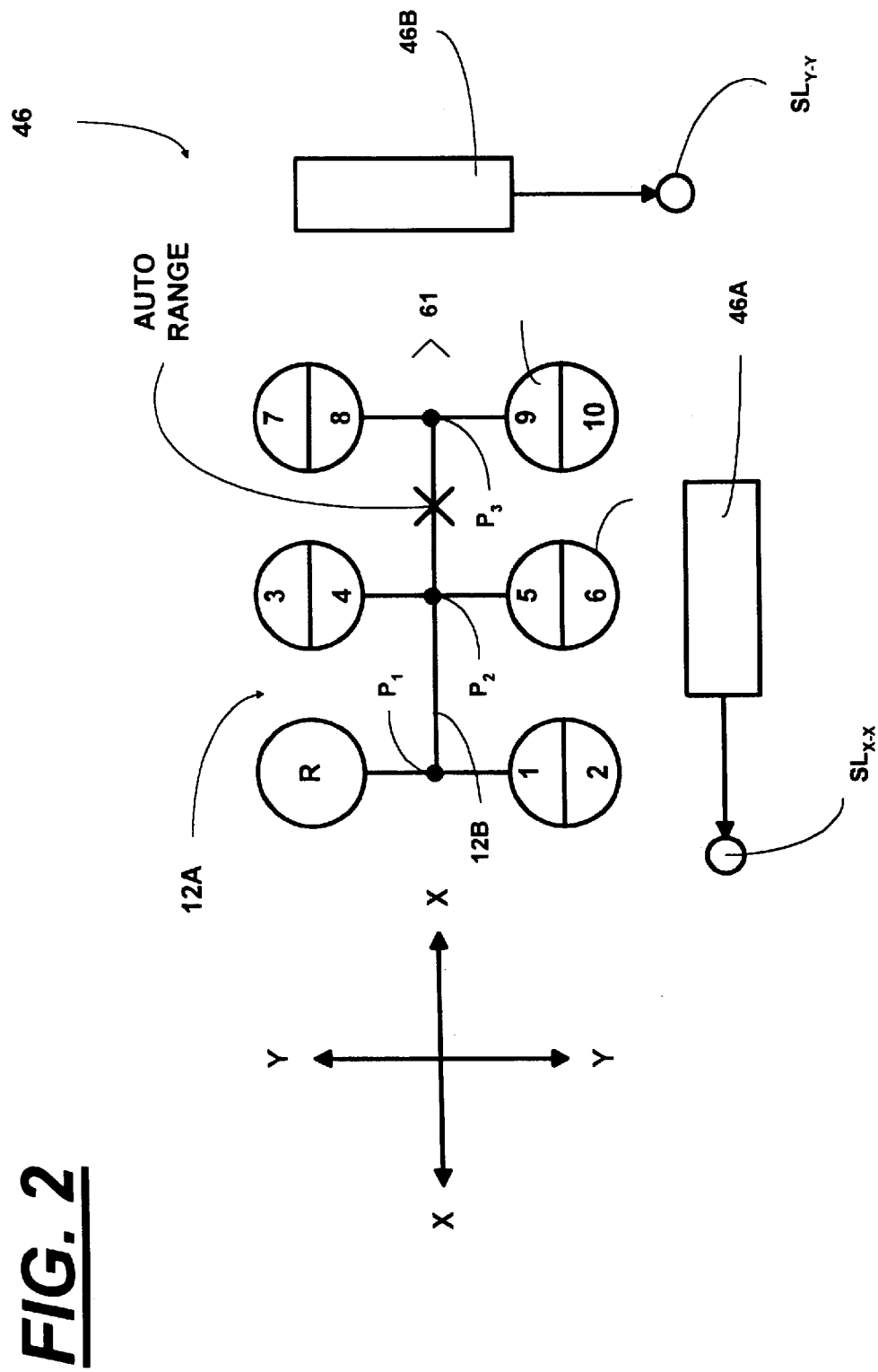
FIG. 2 is a schematic illustration of an X-Y position sensor using the adaptive calibration method/system of the present invention.

The shift pattern 12A illustrated in FIG. 2 is of the well-known "H-type," comprising two or more vertical legs (R and 1st/2nd, 3rd/4th and 5th/6th, 7th/8th and 9th/10th) extending in the so-called "Y-Y" (or engaging/disengaging) direction, and a horizontal connecting leg 12B extending in the "X-X" (or selection) direction and located at a centered neutral position in the Y-Y direction.

As used herein and in the claims, the term "H-type" shift pattern will refer to shift patterns wherein a shift member, such as a shift finger SF or the like, is (i) selectively movable in the X-X direction to align with a selected one of two or more legs extending in the Y-Y direction, (ii) movable in the Y-Y direction away or toward a centered neutral position, respectively, to engage or disengage selected gear ratios, and (iii) movable in the X-X direction between positions of alignment with selected legs only when in the neutral position in the Y-Y direction.

Figure 3A:
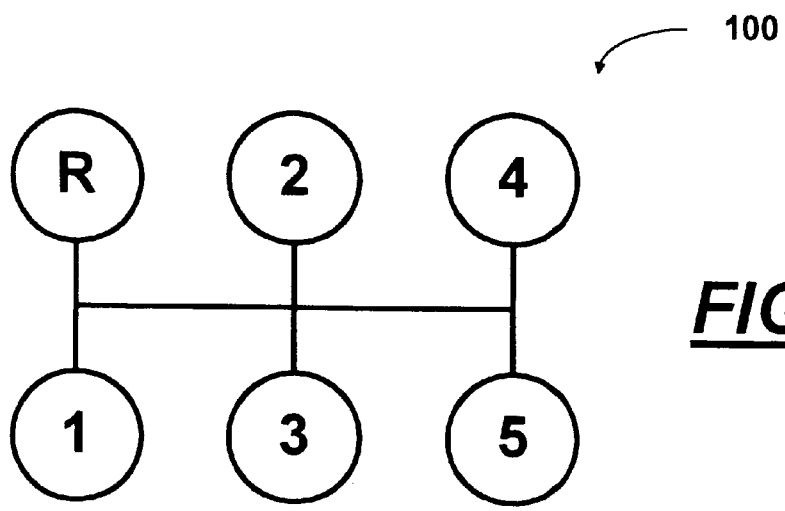
FIGS. 3A–3C are schematic illustrations of typical H-type shift patterns.
Figure 3B:
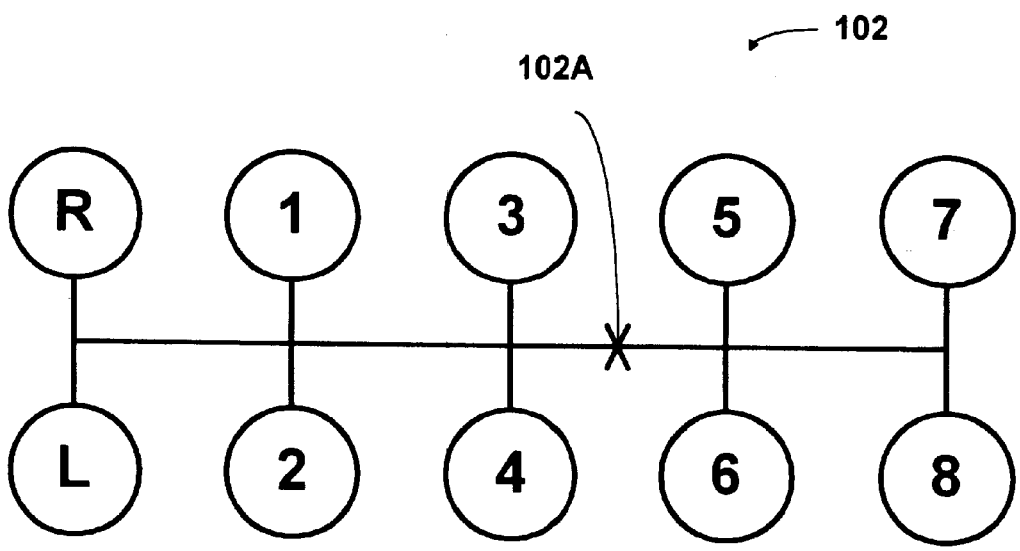
Figure 3C:
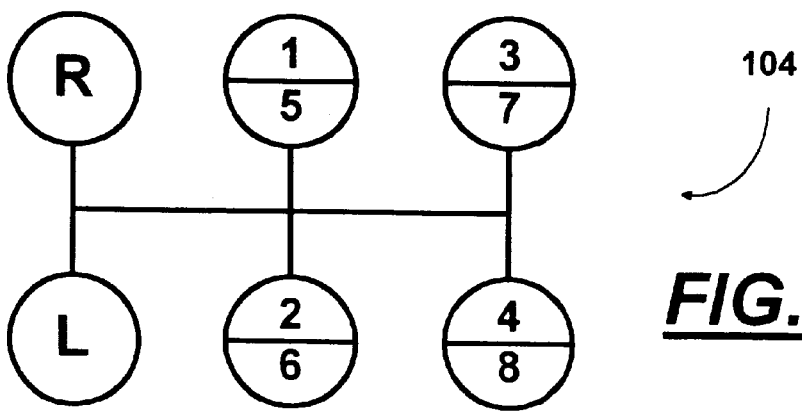

FIGS. 3A–3C are illustrative of typical "H-type" shift patterns. In FIG. 3A, shift pattern 100 is for a five-forward-, one-reverse-speed simple transmission. FIG. 3B illustrates a "double-H" H-type shift pattern 102, and FIG. 3C illustrates a "repeat-H" H-type shift pattern 104, both for a nine-forward speed, one-reverse-speed, range-type transmission. As is well known, for shift pattern 102, an autorange switch at 102A will cause a range shift, while for shift pattern 104, the range must be manually or automatically shifted. The shift member or finger moving in an H-type shift pattern will act on a plurality of shift rails (see aforementioned U.S. Pat. Nos. 5,481,170; 5,281,902 and 4,899,607) or on a single shift shaft (see U.S. Pat. No. 4,920,815, the disclosure of which is incorporated herein by reference) to control shifting of the transmission 12. H-type shift patterns are normally but not necessarily progressive, as illustrated in FIGS. 3A–3C. Controller-assisted transmission system 10 further includes rotational speed sensors 32 for sensing engine rotational speed (ES), 34 for sensing input shaft rotational speed (IS), and 36 for sensing output shaft rotational speed (OS), and providing signals indicative thereof. Engine 18 may be electronically controlled, including an electronic controller 38 communicating over an electronic data link (DL) operating under an industry standard protocol such as SAE J-1922, SAE J-1939, ISO 11898 or the like. A manual clutch pedal (not shown) or an automated actuator (not shown) may be utilized to selectively engage and disengage normally engaged master clutch 20, as is well known in the prior art.

An auxiliary section actuator 40 is provided to control shifting of the auxiliary section splitter and/or range ratios. Preferably, at least the splitter actuator will be a three-position actuator, allowing the splitter section to be shifted to and maintained in a high splitter ratio, a low splitter ratio or a splitter-neutral position, the structure and advantages of which may be appreciated in greater detail by reference to U.S. Pat. Nos. 5,651,292; 5,974,906 and 5,970,810, the disclosures of which are incorporated herein by reference.

Transmission system 10 includes a manually operated shift lever 42 having a shift knob 44 thereon. Shift knob 44 may be of the type described in aforementioned U.S. Pat. No. 5,957,001. As is well known, shift lever 42 is manually manipulated in a known shift pattern (see FIG. 2) for selective engagement and disengagement of various shift ratios. Alternatively, an X-Y shift actuator, which by way of example may be of the types illustrated in U.S. Pat. Nos. 5,481,170; 5,281,902; 4,899,609 and 4,821,590, may be provided for automated or shift-by-wire shifting the transmission main section.

A position sensor assembly 46 is operable to sense the X-Y position of the shift lever in the shift pattern and to provide signals (SL) indicative thereof. X-Y position sensors of this type are known in the prior art and examples thereof may be seen by reference to U.S. Pat. Nos. 5,743,143; 5,894,758; 5,950,491 and 5,911,787, the disclosures of which are incorporated herein by reference. Sensor assembly 46 is illustrated in FIG. 2 and described in greater detail below.

System 10 includes a control unit, preferably a microprocessor-based control unit of the type illustrated in U.S. Pat. Nos. 4,595,986; 4,361,065 and 5,335,566, the disclosures of which are incorporated herein by reference, for receiving input signals 54 and processing same according to predetermined logic rules to issue command output signals 56 to system actuators, such as engine controller 38, auxiliary section shift actuator 40, and the like.

Sensor assembly 46 includes a first sensing member 46A for providing a first signal $SL_{X-X}$ having a magnitude indicative of the X-X position of the shift member in the H-type shift pattern and a second sensor 46B for providing a second signal $SL_{Y-Y}$ having a magnitude indicative of the Y-Y position of the shift member in the shift pattern.

Sensor members 46A and 46B may provide signals which vary in magnitude as to frequency, amplitude, voltage, current, pressure or the like with positions sensed thereby. U.S. Pat. No. 5,743,143 and European Pat. No. 0371975 illustrate typical displacement sensing devices.

Although X-X and Y-Y movements are illustrated as generally perpendicular axial movements, an axial and a rotational movement (as illustrated in U.S. Pat. Nos. 5,743,143 and 5,911,787) are also intended to be included as X-X and Y-Y movements.

Figure 4:
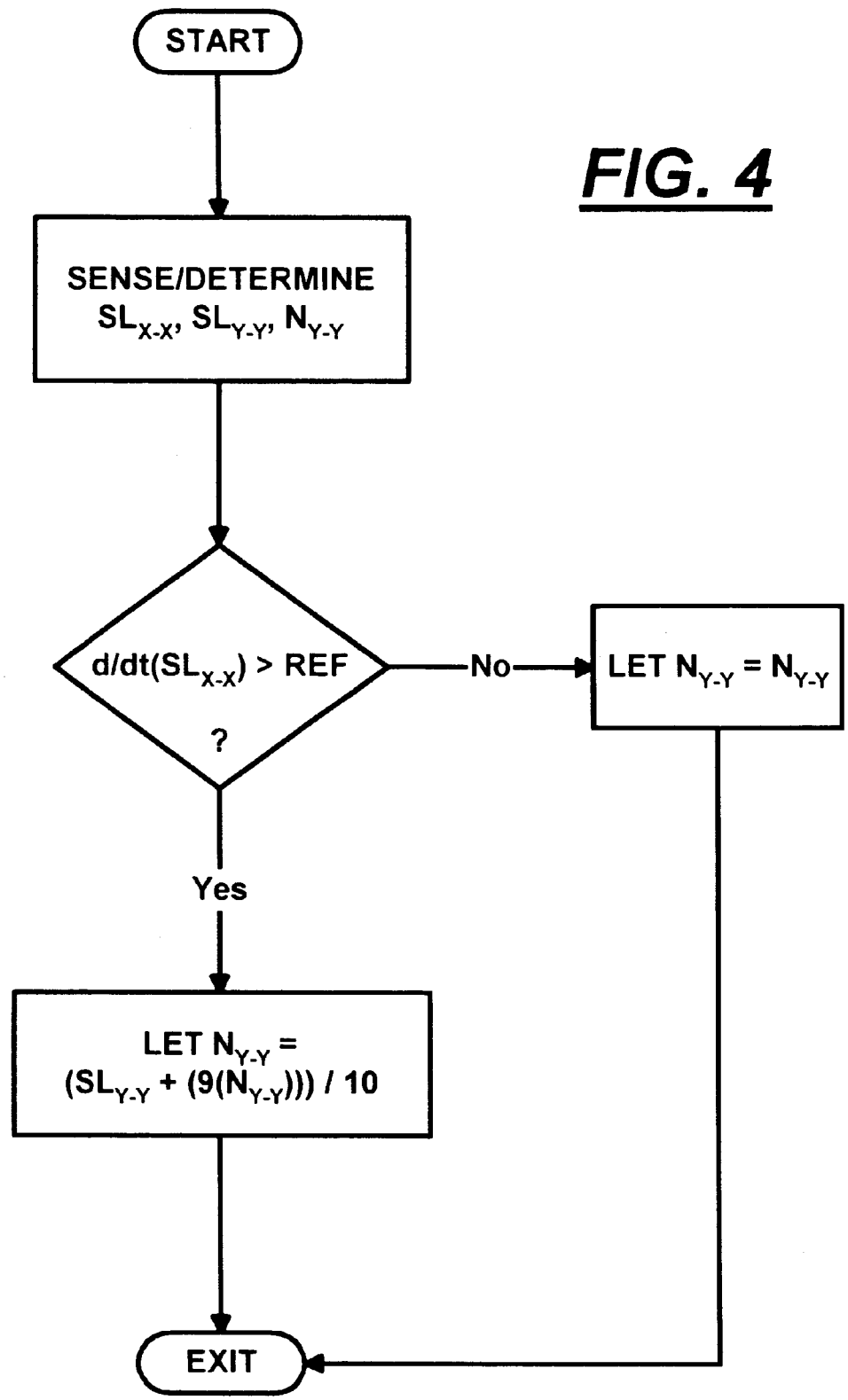
FIG. 4 is a schematic illustration, in flow chart format, of the adaptive calibration method/system of the present invention.

For proper control of system 10, it is important that the current value or magnitude of signal $SL_{Y-Y}$ corresponding to the shift member being at or within a band of neutral 61 in the Y-Y direction ($N_{Y-Y}$) be accurately known. Over time, due to temperature, wear, age and other variables, these values will change. Accordingly, the present invention provides a relatively simple and accurate control technique to calibrate sensor assembly 46 as to the magnitude or the $SL_{Y-Y}$ signal corresponding to neutral ($N_{Y-Y}$) in an H-type shift pattern. FIG. 4 is a flow chart representation of the adaptive calibration system/method of the present invention.

The controller 52 will sense current values of the first and second input signals $SL_{X-X}$ and $SL_{Y-Y}$ from the sensor assembly 52 and will have stored a current value $N_{Y-Y}$ of the second signal that corresponds to the shift member being in the neutral position 61. If the change in the first signal (($SL_{X-X}$ current)–($SL_{X-X}$ last)>REF), or preferably the rate of change of the first signal ((d/dt) $SL_{X-X}$) is greater than a reference ((d/dt) $SL_{X-X}$>REF?), that is a condition that indicates that the shift member must be in the Y-Y neutral position and the value of the second signal at that is the correct value corresponding to neutral. Preferably but not necessarily, the control will use a filtered value to determine the value of the second signal that is neutral $N_{Y-Y}$.

In the current example, to provide a filtered/averaged value, if d/dt($SL_{X-X}$) does exceed the reference value, $N_{Y-Y}$ is the sum divided by ten of (i) the current value of the second signal added to (ii) nine times the existing value $N_{Y-Y}$. Other filtering and average techniques may be utilized to determine a new value $N_{Y-Y}$ of the second signal considered to correspond to neutral in the Y-Y direction.

The adaptive calibration technique of the present invention also may be utilized to calibrate the value of the $SL_{X-X}$ signal corresponding to alignment of the shift member SF with one of the vertical legs (R-½ or ¾–⅝ or ⅞–%₁₀) in the shift pattern. Briefly, when the change, or rate of change, of the $SL_{Y-Y}$ signal exceeds a reference value, the shift member must be in an X-X position corresponding to one of the legs of the shift pattern.

Accordingly, it may be seen that a new and improved system/method for adaptively calibrating an X-Y position sensor is provided.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A method for adaptively calibrating a position sensor (46) for sensing a position of a shift member movable in an H-type shift pattern in an X-X direction for selection of gear ratios to be engaged and disengaged, and in a Y-Y direction from and toward a centered neutral position for engaging and disengaging selected gear ratios, said position sensor providing a first signal ($SL_{X-X}$) having a magnitude indicative of a sensed X-X position of said shift member in said shift pattern and a second signal ($SL_{Y-Y}$) having a magnitude indicative of a sensed Y-Y position of said shift member in said shift pattern, said method comprising the steps of:

sensing current values of said first and second signals;

determining a value indicative of a change in said first signal;

comparing said value indicative of a change in said first signal to a reference value;

if said value indicative of a change in said first signal exceeds said reference value, determining a neutral value ($N_{Y-Y}$) indicative of a neutral position of said shift member in said Y-Y direction as a function of said current value of said second signal.

2. The method of claim 1 wherein said value indicative of a change in said first signal is indicative of a derivative with respect to time of said first signal ((d/dt) $SL_{X-X}$).

3. The method of claim 1 wherein the function of said current value is a filtered average of said current value and previously determined values of said neutral value indicative of said shift member in the neutral Y-Y position.

4. The method of claim 2 wherein the function of said current value is a filtered average of said current value and previously determined values of said neutral value indicative of said shift member in the neutral Y-Y position.

5. A system for controlling a vehicular transmission system 10 including a shift member (SF) movable in an H-type shift pattern (12A) in an X-X direction to two or more X-X selection positions ($P_1$, $P_2$, $P_3$) for gear ratio selection and in a Y-Y direction from and toward a neutral Y-Y position (61) for engaging and disengaging selected gear ratios, said system including an X-Y position sensor (46) for providing a first signal ($SL_{X-X}$) indicative of a current X-X position of said shift member in said shift pattern and a second signal ($SL_{Y-Y}$) indicative of current Y-Y position of said shift member in said shift pattern, a controller (52) for receiving input signals (54), including said first and second signals, and processing same according to logic rules to issue command output signals (56) to system actuators, said logic rules including rules for:

(i) sensing current values of said first and second signals;

(ii) determining a first value indicative of a change in said first signal;

(iii) comparing said value indicative of a change in said first value to a first reference; and (iv) if said first value indicative of a change in said first value exceeds said first reference, determining as a function of the current value of said second signal, a neutral value ($N_{Y-Y}$) corresponding to the value of said second signal when said shift member is in the neutral said shift member is in the neutral Y-Y position in said shift pattern.

6. The system of claim 5 wherein said first value indicative of change in said first signal is indicative of a derivative with respect to time of said first signal (($d^n/dt^n$) $SL_{X-Y}$).

7. The system of claim 6 wherein said derivation is a first derivative with respect to time ((d/dt) $SL_{X-X}$).

8. The system of claim 7 wherein said rules further comprise rules for:

(v) determining a second value indicative of a change in said second signal;

(vi) comparing said value indicative of a change in said second signal to a second reference value; and (vii) if said second value exceeds said second reference, determining as a function of the current value of said first value, an alignment value corresponding to the value of said first signal when said shift member is in one of said X-X selection positions.

9. The system of claim 8 wherein said second value is indicative of a rate of change in said second signal ((d/dt) $SL_{Y-Y}$).

10. The system of claim 8 wherein said determination as a function of said current value of said first signal is an averaging technique.

11. The system of claim 6 wherein said rules further comprise rules for:

(v) determining a second value indicative of a change in said second signal;

(vi) comparing said value indicative of a change in said second signal to a second reference value; and (vii) if said second value exceeds said second reference, determining as a function of the current value of said first value, an alignment value corresponding to the value of said first signal when said shift member is in one of said X-X selection positions.

12. The system of claim 11 wherein said second value is indicative of a rate of change in said second signal ((d/dt) $SL_{Y-Y}$).

13. The system of claim 11 wherein said determination as a function of said current value of said first signal is an averaging technique.

14. The system of claim 6 wherein said shift member is moved by a shift actuator responsive to said output signals (56) from said controller (52).

15. The system of claim 6 wherein said determination as a function of said current value of said second signal is an averaging technique.

16. The system of claim 15 further comprising a manual shift lever (42) for manually moving said shift member (SF) is said shift pattern.

17. The system of claim 15 wherein said shift member is moved by a shift actuator responsive to said output signals (56) from said controller (52).

18. The system of claim 5 wherein said determination as a function of said current value of said second signal is an averaging technique.

19. The system of claim 18 wherein said shift member is moved by a shift actuator responsive to said output signals (56) from said controller (52).

20. The system if claim 18 further comprising a manual shift lever (42) for manually moving said shift member (SF) in said shift pattern.

21. The system of claim 5 wherein said shift member is moved is by a shift actuator responsive to said output signals (56) from said controller (52).

22. The system of claim 5 wherein said rules further comprise rules for:

(v) determining a second value indicative of a change in said second signal;

(vi) comparing said value indicative of a change in said second signal to a second reference value; and (vii) if said second value exceeds said second reference, determining as a function of the current value of said first value, an alignment value corresponding to the value of said first signal when said shift member is in one of said X-X selection positions.

23. The system of claim 22 wherein said second value is indicative of a rate of change in said second signal ((d/dt) $SL_{Y-Y}$).

24. The system of claim 22 wherein said determination as a function of said current value of said first signal is an averaging technique.

25. The system of claim 5 further comprising a manual shift lever (42) for manually moving said shift member (SF) in said shift pattern.

26. The system of claim 6 further comprising a manual shift lever (42) for manually moving said shift member (SF) in said shift pattern.

* * * * *